United States Patent [19]

Wooler et al.

[11] 4,025,687

[45] May 24, 1977

[54] LAMINATES

[75] Inventors: Alan Metcalf Wooler; Dennis Charlton Allport, both of Manchester, England

[73] Assignee: Imperial Chemical Industries Limited, London, England

[22] Filed: Aug. 18, 1975

[21] Appl. No.: 605,504

[30] Foreign Application Priority Data

Oct. 8, 1974 United Kingdom ............ 43512/74

[52] U.S. Cl. .............................. 428/310; 428/313; 428/423; 260/2.5 AW
[51] Int. Cl.² .......................................... B32B 3/26
[58] Field of Search ............ 260/2.5 AW; 428/310, 428/313, 314, 315, 425, 423, 424

[56] References Cited

UNITED STATES PATENTS

| 3,068,043 | 11/1962 | Komenda | 428/313 |
| 3,644,168 | 2/1972 | Bonk et al. | 428/315 |
| 3,647,608 | 3/1972 | Enlow et al. | 428/313 |
| 3,814,659 | 6/1974 | Nadeau | 428/313 |
| 3,903,346 | 9/1975 | DeLeon et al. | 428/313 |

FOREIGN PATENTS OR APPLICATIONS 1,395,435 5/1975 United Kingdom

*Primary Examiner*—William J. Van Balen
*Attorney, Agent, or Firm*—Cushman, Darby & Cushman

[57] ABSTRACT

A laminated panel having improved fire resistance comprising a core of rigid isocyanurate based foam sandwiched between two facing sheets, characterized in that there is embedded within the foam core a binding material; the whole being bonded together by the foam core into a unitary construction.

3 Claims, No Drawings

LAMINATES

The present invention relates to improvements in or relating to laminates, and more particularly to laminates having a core of rigid synthetic foam.

Laminated rigid foam panels are widely used in the building and construction industry as sound and thermal insulating materials and as non-load bearing structural members. It is however important that building materials do not readily burn and propogate fire through a building. It is already known that isocyanurate based foams have excellent high temperature and fire resistant properties in comparison with other polyurethane foams, but under certain conditions it has been observed that whilst the foam itself is extremely resistant to burning, deep cracks often develop through which flames can penetrate and heat is conducted, thus leading to premature failure of the foam panel. It has now been found that if a binding material is embedded in the foam core of the laminate the cracking is moderated and consequently the fire resistance is improved.

Thus, according to the present invention, there is provided a laminated panel comprising a core of rigid isocyanurate based foam sandwiched between two facing sheets characterised in that there is embedded within the foam core a binding material; the whole being bonded together by the foam core into a unitary construction.

The invention also includes methods for making the laminates of the invention.

Rigid isocyanurate based foams to which the invention relates are rigid polymeric foams characterised by the presence therein of an isocyanurate ring structure. The formulation of such foams has already been described in the prior art. They are conventionally made by reacting, in the presence of a blowing agent and a catalyst capable of polymerizing isocyanate groups to isocyanurate structures, an excess of an organic polyisocyanate with a polymeric polyol. Additives such as surfactants plasticisers, stabilisers, fillers and pigments may also be included in the foam ingredients.

The facing sheets and binding material may be of any material capable of adhering to the isocyanurate based foam in the gelled, partly cured state. Suitable materials for the facing sheets include, for example, rubber, metal, asbestos, plasterboard, fibre glass, wood, paper, cardboard and plastic materials, for example, polyvinyl chloride, acrylonitrile/butadiene/styrene copolymer or polyester/fibre glass mixtures. The fire resistance of the laminate as a whole will however be further improved if non-combustible facing sheets are used, and hence the preferred laminate has at least one facing sheet made of sheet metal, metal foil, asbestos, asbestos cement or plaster board. The outer surface of the facing sheets can be smooth or embossed or intented to provide functional or decorative effects.

The binding material may be embedded anywhere within the foam core but preferably not deeper than approximately one inch (2.5 cm) from one or both outer surfaces of the foam core. It is particularly advantageous if the binding material is embedded in one or both outer surfaces of the foam core such that it touches one or both inner surfaces of the facing sheets. The binding material may be of any material which improves the coherence of the foam under conditions of high temperature and is capable of adhering to the isocyanurate based foam as aforesaid. Suitable materials are metal wires, filaments or meshes; glass, textile or plastic fibers, strands, filaments, strips or extrusions in single, random, woven or meshed form. Woven or meshed material must however be of a sufficiently coarse mesh or weave to allow the foam mix to penetrate the intertices. Particularly suitable is wire mesh, for example chicken wire.

The laminates of the invention may be manufactured in any known equipment used for the production of conventional foam laminates, which may be a "horizontal" or "vertical" batch mould, jig or press, or a continuous laminating machine.

In a horizontal batch process, where the faces of the laminate to be produced lie in a horizontal plane, a first facing sheet is laid in the bottom of the mould and on top of it is placed the binding material which may if desired, be adhered to the facing sheet with a suitable adhesive, or if both the facing sheet and binding material are metallic they may be welded or soldered together. A measured quantity of foam mix is poured or sprayed into the mould and a second facing sheet, optionally with binding material adhered to its under surface, is either floated on top of the foam mix, in which case the binding material may not need to be adhered to it, or support in a horizontal frame at the top of the mould, and the mould then closed. The quantity of foam mix used is sufficient to give some degree of "overpacking" when fully cured: that is to say that if the foam were allowed to rise freely it would achieve a thickness marginally greater than it does with the mould closed. This overpacking reduces the formation of voids between the second facing sheet and the foam core and hence improves adhesion. The sides of the mould are coated with a release agent to facilitate removal of the laminate from the mould. Alternatively edging members, which become part of the finished laminate, may be inserted in the mould before the foam is introduced. These members may be constructed of materials hereinbefore exemplified for the facing sheets and may be of special design, for example, they can be arranged to mate with supporting frames and to provide overlapping or tongue and groove effects. When it is require to produce a laminate having the binding material embedded inside the foam it may be convenient to support the binding material in a plane above that of the lower facing sheet by means of brackets, or by attachment to the edging members when these are used.

In a "vertical" batch process it is most convenient to insert in a jig two facing sheets, spaced apart on three sides by edging members, the forth side presenting an opening at the top of the mould; the binding material being adhered to one or both facing sheets or held in a plane between the facing sheets by attachement to the edging members. The foam mix may be introduced into the mould by any of a number of well known filling techniques, for example by direct pour or by using a reciprocating injection head, and for larger size laminates the foam core may be built up in layers allowing one layer to foam before introducing the next when a frothed system is preferred.

The laminates of the invention may be produced continuously on any conventional continuous laminating machine, but particularly suitable are those machines adapted to accomodate rigid discontinuous facing sheets and edging members, for example those described in British Patent Specifications Nos. 1,098,471; 1,164,305 and 1,245,881.

The relative fire resistance of foam laminates may be measured under test conditions similar to those described in the British Standards Institution's "Fire Tests on Building Materials and Structures" (BS 476: Part 8: 1972). Briefly, one face of the laminate is exposed to a radiant gas furnace which can be accurately controlled to follow a standard temperature profile and the temperature of the cooler outer face is measured at five points — at the center and at the center of each quarter — at regular intervals. The laminate is judged to have failed, in terms of its insulation properties, when either a single point reading has risen above 180° C or the mean temperature has risen through 140° C. In the case of a laminate face with a non-combustible material the integrity of the foam core can be observed after stripping off the facing sheets.

The laminates of the present invention may be used in all outlets where synthetic foam laminates are currently used but because of their improved fire resistant properties they may also be used in applications, notably in the building industry, for which conventional foam laminates have hitherto been unacceptable due to their poor fire-resistant properties. Particularly suitable are laminates which have both facing sheets made of non-combustible materials such as for example, sheet metal, asbestos, asbestos cement and plasterboard.

The invention is illustrated, but not limited, by the following examples in which parts and percentages are by weight.

EXAMPLE 1

CONTROL EXPERIMENT — LAMINATE WITHOUT BINDING MATERIAL (This control experiment does not of itself constitute part of the invention.)

A foam laminate was produced by first constructing a panel assembly comprising a softwood frame of internal dimensions 16½ × 16½ × 2 inches and external dimensions 18 × 18 × 2 inches, and two facing sheets of 20 s.w.g. mild steel. A foam mix capable of reacting to form an isocyanurate based rigid foam, was prepared by mixing the following ingredients: an oxypropylated tolylene diamine of hydroxyl value 310 mg KOH/g (20.4 parts); a polyoxypropylene-polyoxyethylene block copolymer containing approximately 10% of ethylene oxide residues and having a molecular weight of approximately 2000 (4.0 parts); a siloxane-polyalkylene oxide copolymer (1.0 part); a blend of potassium acetate, ethylene glycol and water in the ratio 20:20:1 (1.5 parts); trichlorofluoromethane (28.0 parts) and a diphenylmethane diisocyanate composition containing approximately 55% of diisocyanato diphenyl methane isomers, the bulk of the remainder of the isocyanate being present as polymethylene polyphenyl polyisocyanates of functionality greater than two, the NCO content being 29.2%, (100.0 parts).

The mixture was poured into the panel assembly, pre-heated to 35°–40° C, which was then placed in a veneer press. The foam mix gave a 15% overpack density of 45 kg/m³ with a dwell time of 5 minutes. The rigid foam laminates was removed and allowed to cure fully for at least 24 hours before its fire resistance was measured.

A small scale fire resistance test was carried out by clamping the laminate to a surface spread of flame gas furnace, the temperature of which was monitored by thermo-couples. Five thermocouples were also attached to the cooler outer metal face of the laminate, one being at the center and the others being at the centre of each quarter of the panel. The temperature of the furnace was raised in accordance with BS 476, Part 8, Section 1.4.2 viz. on a temperature profile according to the relationship $T-T_o = 345 \log_{10}(8t+1)$, where $t$ is the time of test in minutes; $T$ is the furnace temperature in ° C at time $t$; and $T_o$ is the initial furnace temperature in ° C and lies between 10°–40° C, and the temperature rises on the cooler face were recorded at two minute intervals.

The laminate failed (in terms of its insulation properties) after 34 minutes when a single point reading had risen above 180° C. (According to BS 476 Part 8, specimen is deemed to have failed when either a single point reading has risen above 180° C or the mean temperature through 140° C.) At this point the test was stopped, the laminate cooled and the integrity of the foam core examined by stripping off the heated facing. Random, large, deep cracks were present in the foam core.

LAMINATE CONTAINING ½ INCH MESH BINDING MATERIAL IN FOAM CORE 1 INCH FROM LAMINATE FACE

A foam laminate was produced using the same materials and in the same manner as the laminate of the control experiment except that a layer of ½ inch mesh chicken wire was inserted within the middle of the softwood frame, such that the layer of chicken wire was a distance of approximately 1 inch from both planes formed by the outer edges of the frame. After being allowed to fully cure for at least 24 hours, the laminate was subjected to the same small scale fire resistance test as the laminate of the control experiment.

The failure time of the laminate, as indicated by a single point reading rising above 180° C, was 38 minutes showing an approximately 12% improvement over the control. Examination of the integrity of the foam core showed large cracks has formed but these were arrested at the wire barrier.

EXAMPLE 2

LAMINATE CONTAINING 1 INCH MESH BINDING MATERIAL IN FOAM CORE 1 INCH FROM LAMINATE FACE

A foam laminate was produced as in Example 1 except that 1 inch mesh chicken wire was substituted for ½ inch chicken wire.

The failure time of the laminate, as indicated by a single point reading rising above 180° C was 38 minutes showing an approximately 12% improvement over the control. Examination of the integrity of the foam core showed large cracks had formed which were not arrested at the wire barrier.

EXAMPLE 3

LAMINATE CONTAINING ½ INCH MESH BINDING MATERIAL SOLDERED TO LAMINATE FACE

A foam laminate was produced as in Example 1 except that the layer of ½ inch mesh chicken wire was soldered to one face to the laminate, that same face being clamped to the furnace for the purpose of the small scale fire resistance test.

The failure time of the laminate, as indicated by a single point reading rising above 180° C was 52 minutes showing an approximately 53% improvement over the control. Examination of the integrity of the foam core showed very small cracks.

What we claim is:

1. A laminated panel which comprises a core of rigid isocyanurate based foam sandwiched between two facing sheets, characterized in that there is embedded within the foam core a wire mesh binding material, such that the wire mesh touches the surface of at least one facing sheet, the whole being bonded together by the foam core into a unitary construction.

2. A panel according to claim 1 wherein at least one facing sheet is made from a non-combustible material.

3. A panel according to claim 2 wherein the non-combustible material is sheet metal.

* * * * *